Nov. 1, 1927.
F. W. CORSALLI
SMELTING FURNACE
Filed Aug. 9, 1921
1,647,608
7 Sheets-Sheet 1
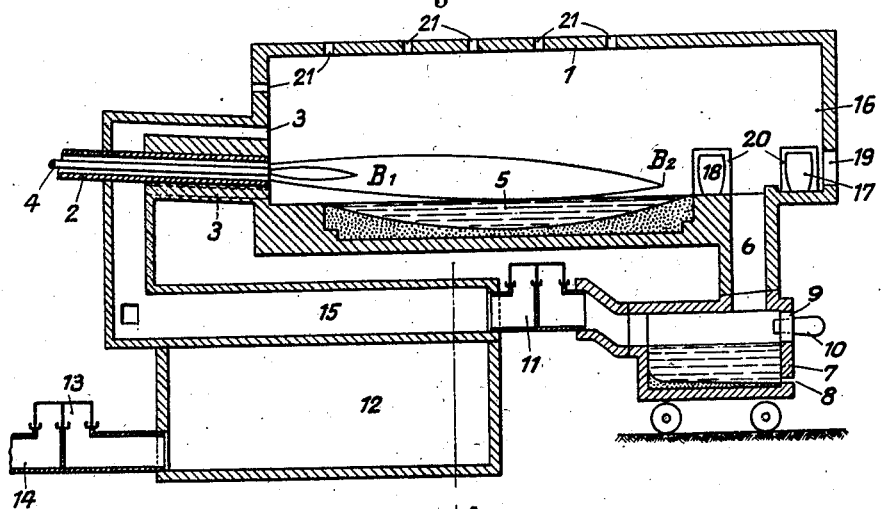
Fig. 1.
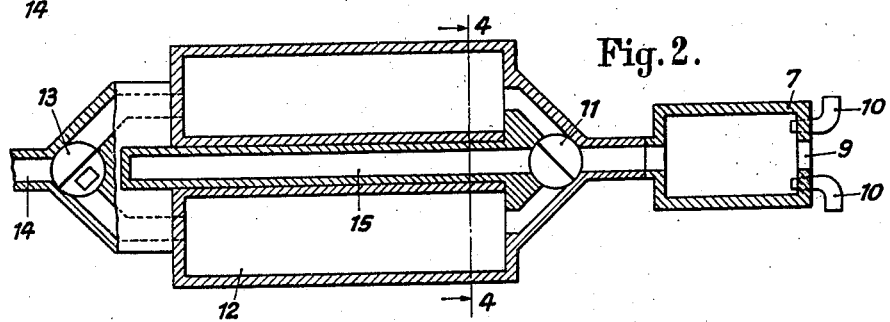
Fig. 2.
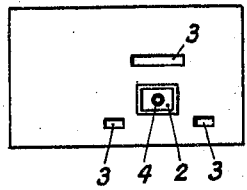
Fig. 3.
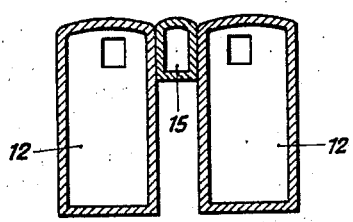
Fig. 4. (4-4)
Witnesses:
Inventor:
F. Wilhelm Corsalli,
By his Atty,

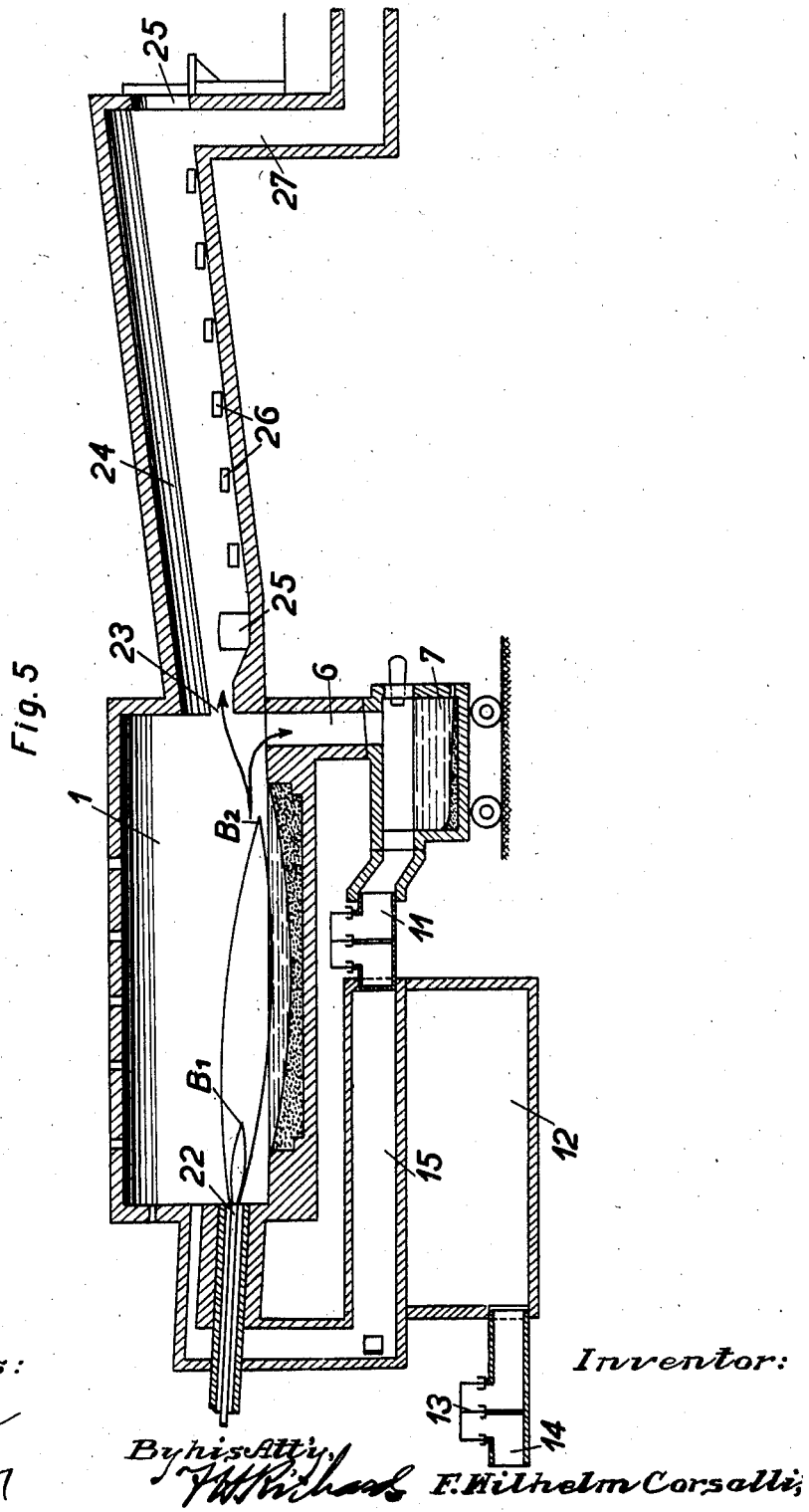

Nov. 1, 1927. 1,647,608

F. W. CORSALLI

SMELTING FURNACE

Filed Aug. 9, 1921  7 Sheets-Sheet 3

Witnesses:

Inventor:
F. Wilhelm Corsalli,
By his Att'y,

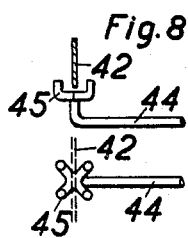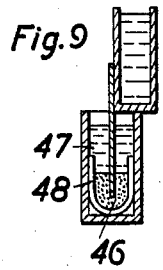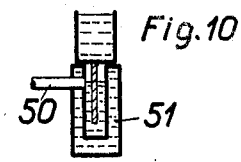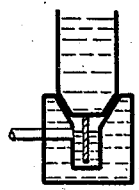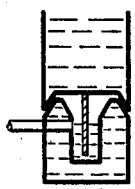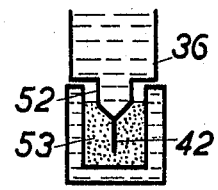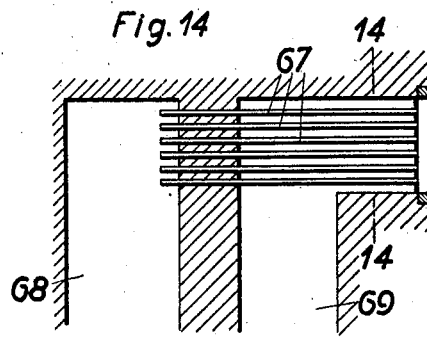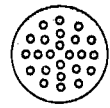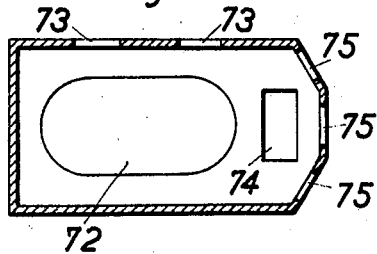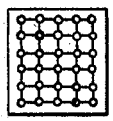

Nov. 1, 1927.
F. W. CORSALLI
1,647,608
SMELTING FURNACE
Filed Aug. 9, 1921   7 Sheets-Sheet 5
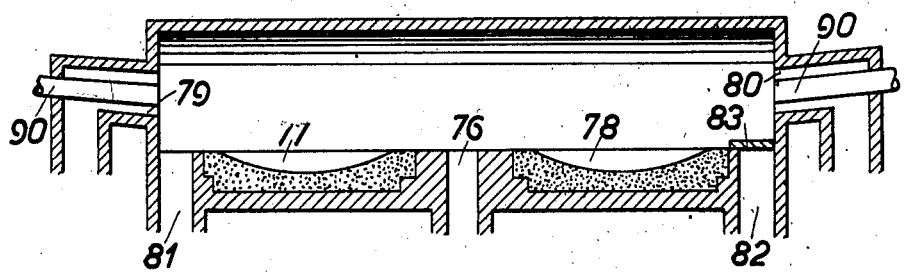
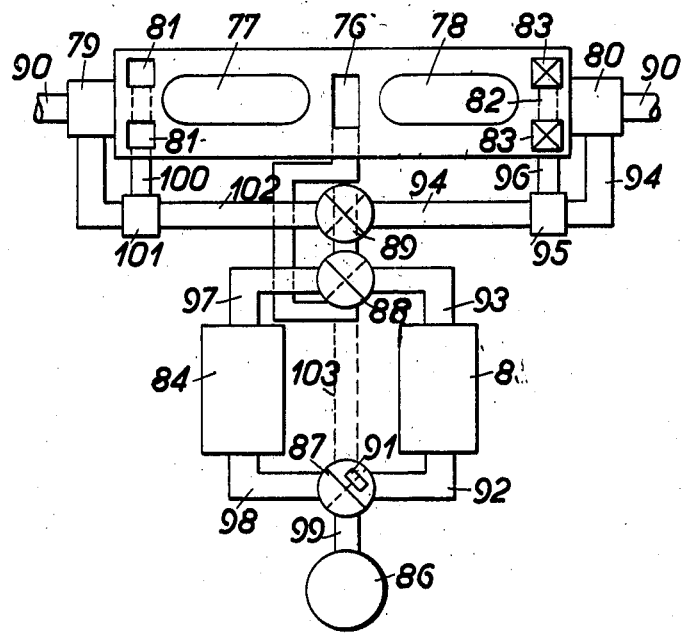

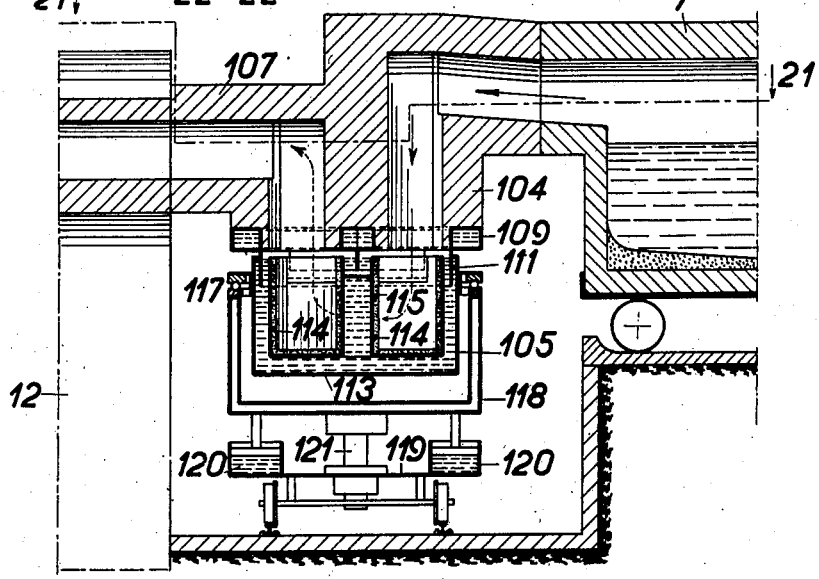
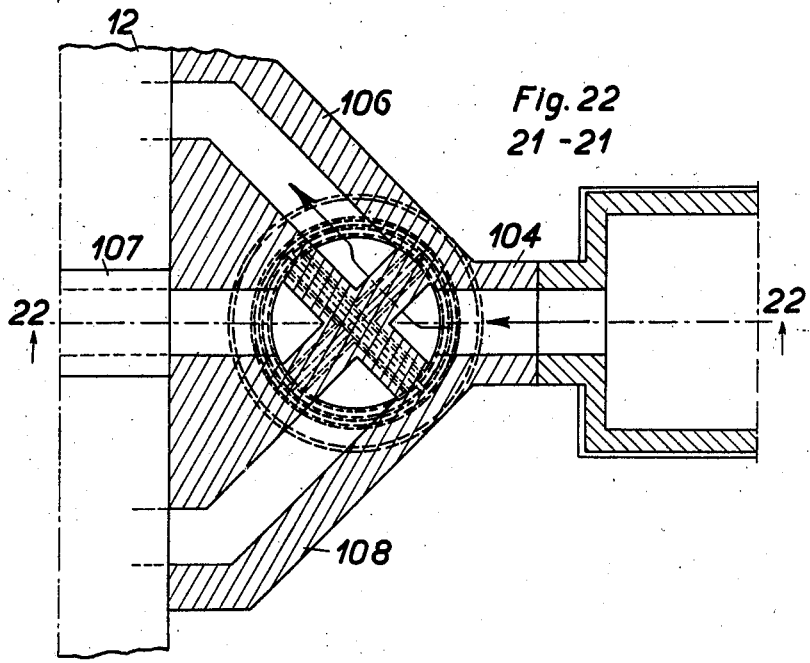

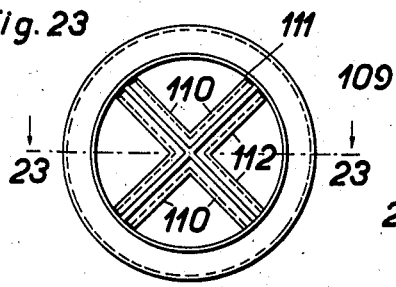
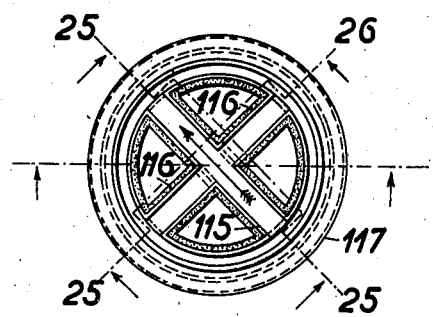
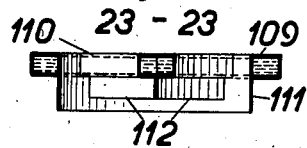
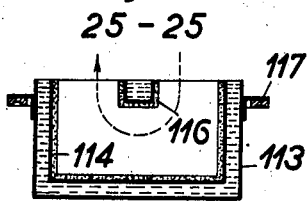
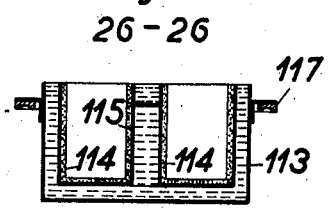

Patented Nov. 1, 1927.

1,647,608

UNITED STATES PATENT OFFICE.

FRIEDRICH WILHELM CORSALLI, OF BERLIN, GERMANY.

SMELTING FURNACE.

Application filed August 9, 1921, Serial No. 490,960, and in Germany September 19, 1913.

(GRANTED UNDER THE PROVISIONS OF THE ACT OF MARCH 3, 1921, 41 STAT. L., 1313.)

This invention relates to a smelting furnace arrangement which is intended more particularly for the production of iron and steel.

The characteristic features of the new smelting furnace arrangement are, that the flame is passed through the furnace in the same direction, the combustion gases are taken off in a downward direction, and a slag furnace is introduced between the smelting furnace and the heat accumulator.

While the fact is not overlooked that it has already been proposed to take the flame in one direction only through the furnace and draw off the combustion gases in a downward direction, the combination of these two features with a slag furnace is new, and more particularly the taking of the flames always from the same end of the flames furnace makes it possible to keep the slag permanently fluid that is to employ a slag furnace, the slag furnace in itself is also new.

In the slag furnace the hot waste gases coming from the top strike the slag bath vertically and then pass horizontally over the bath, thus keeping the slag well heated so that it remains in a molten or liquid state. In the furnace the slag is either mixed with additional material for making it suitable as a fertilizer or for the manufacture of paving stones or the slag may be granulated straight from the furnace.

When the slag is to be used in the latter manner it is important that the furnace should form a retaining effect i. e. the slag which flows during the smelting process in different quantities at different times is collected in the furnace and can be withdrawn from it in a continuous stream. This retaining effect is of special importance in the pig iron ore process.

It is also possible to obtain by reduction separate components of certain kinds of slag in the slag furnace, for instance titanium. For this purpose a specially high temperature is required which cannot be obtained with the waste gases alone. For this reason the slag furnace according to the invention is fitted with additional heating means, for instance, gas burners or electric heating means, which in this case serve to raise the temperature. With the aid of the burners the slag furnace can also be used regardless of the direction of the flames.

While slag chambers are known through which the waste gases flow, these well known chambers comprise none of the features of a slag furnace, as there is neither a charging door nor a tapping hole or burners, so that every arrangement for the working of the slag is lacking and in the case of reversible furnaces the slag would freeze, while the hot waste gases are not passing through the chamber.

By taking the flames always in one direction through the furnace, it is possible to construct the burner of the furnace in such a manner that the stream of gas is either surrounded outside and inside by air or the reverse. In this manner the flame obtained has two combustion points, an inner one and an outer one, which are easily regulated. By varying the gas and air pressures the combustion points can be displaced. As a stream of gas or air surrounds the flame, the latter will act as an oxidizing or reducing agent.

As the wall carrying the burner of the new furnace remains cool it is possible to use for the furnace a comparatively complicated burner of a special kind, which in the case of reversible furnaces would be destroyed by the heat of the combustion gases. Various forms of constructions of such burners are hereinafter described. It is however to be understood that the burners which have not been capable of being used hitherto in connection with smelting furnaces, for instance, an enlarged type of Bunsen burner, may be also used. One has quite a free hand in this respect.

It has been attempted to obtain the same object with a burner in which air was blown from the side, over and under the stream of gas. In this case however, neither of the two regulatable combustion points were obtained nor was it possible to reverse the arrangement in the manner described so that the flame could not be regulated in such an effective manner. Burners having a threefold layering of air and gas described above have already been used for heating steam boilers, but not for smelting furnaces in which they have the action described above.

According to this invention the burner is laterally displaced out of the central plane of the furnace, so that the flame exercises a stirring action on the smelting bath and the time taken for treating the material to be smelted in the furnace is shortened.

In order to prevent the wall of the furnace, which lies on the opposite side from the burner, from becoming unduly heated owing to the flames being taken from one side of the furnace only, the said wall of the furnace is placed back sufficiently behind the outlet duct for the combustion gases so that the gases will not impinge upon the said wall. By this means there will be between the outlet duct of the furnace wall a space in which the material to be treated is given a preliminary heating before being introduced into the bath. In this space red or yellow brass can be smelted in crucibles.

The new smelting furnace system is so arranged that its separate parts, the smelting furnace, the slag furnace, the heat storing means, the reversing arrangement, and the gas and waste ducts are arranged so as to be as accessible as possible so as to avoid large masses of masonry. In spite of this the counter-flow principle is retained for gas and air on the one hand and the waste gases on the other.

Since the flames are always taken in the same direction in the smelting furnace it becomes possible to divide the flow of the waste gases behind the smelting bath and to take one part of the flow through the slag furnace and the heat storing means, while the other part of the flow is taken to the chimney through a heating or reheating furnace. This second furnace can also be a roasting, calcining, agglomerating, or a rotating furnace, such as are, for instance, used in the manufacture of cement. The dividing of the waste gases is of itself known. Its use, however, with the furnace arrangement according to this invention is of special advantage as the continuous guiding of the flame in the same direction makes a constant and uniform heating of the second furnace possible.

The temperatures in the entire furnace arrangement are very high in consequence of directing the flame always in one path. In consequence thereof the usual reversing valves cannot be used directly for a furnace according to this invention, and it is necessary to provide special means in order to cope with the high temperatures. This difficulty is corrected according to this invention by careful construction of the cooling and packing of the valve. The details thereof will be more fully described in the following specification.

The invention also refers to a new form of construction of that side of the furnace from which the waste gases are drawn away to the slag furnace. This consists in providing working doors on the rear side, which doors are arranged in such a manner that when they are opened no air will enter in the proper working space of the furnace, but any air that may enter would be drawn directly into the drawing-off passage. By means of these doors it is possible after the charge has been introduced, to close the furnace hermetically to a certain extent whereby the carrying out of the reducing smelting processes is substantially improved.

The new furnace arrangement may, for certain purposes, be carried out also without the slag furnace, or the latter may be in the form of a simple slag collecting space (slag chamber) or dust chamber, or be formed in any other suitable way. Furthermore the new furnace may also be utilized as a double furnace by providing a second furnace behind the drawing-off passage, which second furnace will be entirely like the described furnace. In this case only one furnace will be heated, and the waste gases are partly led through the heat accumulator and partly led through the other furnace in which they serve in this kind of arrangement for the pre-heating of the introduced charge. In that case it is necessary to protect the burner of the disconnected furnace by a special duct which conducts away the waste gases.

As one of the valves of the new smelting furnace, owing to its position between the slag chamber and the heat accumulators, would under the present structural arrangement, of necessity lie under the smelting furnace, and which position would be an inconvenient extension of the passages from the furnace to the slag chamber, and from the heat accumulators again to the furnace, since it is not only the valve itself which has to find its place underneath the furnace, but also the devices for the lifting, lowering and rotating of the bell, a new arrangement is shown in the invention.

The drawback or disadvantage above referred to is avoided in this invention by arranging the passage openings leading to the valve to descend and the valve itself, the rotatable bell, is arranged in a suspended manner. In this way the valve according to the invention is positioned under the passage between the slag chamber and the heat accumulator and it extends in proximity to the latter in a downward direction where the necessary space for the valve already exists. Details of the new valve which follow from its substantially reverse arrangement will hereinafter be described.

In the accompanying drawing,

Figure 1 shows a new furnace in vertical section,

Figure 2 is a horizontal section through the heat accumulator,

Figure 6:
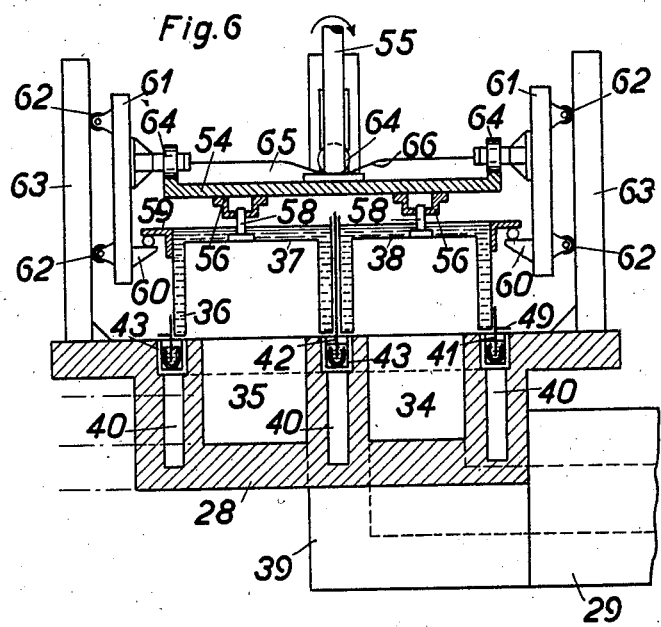

Figure 3 a plan view of the burner seen from the interior of the furnace.

Figure 4 is a section through the heat accumulator along line 4—4 of Figure 2,

Figure 5 shows another embodiment of the new furnace in a vertical section,

Figures 6–13 illustrate a valve for the new furnace with a great number of details, Figures 14–17 show different new arrangements of burners, Figures 18–20 illustrate further embodiments of the new furnace, and Figures 21–27 show a second form of a valve for the new furnace with a number of details.

The gas duct 2 and the air ducts 3 enter the furnace 1 from the left. In the duct 2 there is a separate air supply pipe 4. On air and gas flowing out of these apertures, a flame is formed in the manner shown in the drawing. The flame thus formed, as is well known, consists of three regions: the inner cone which is green in color, the outer cone which is blue in color, and the colorless region between these two. The inner cone is the reducing flame, the blue mantle is the oxidizing flame, and the colorless part of the flame is the region of complete combustion and, therefore, the hottest part of the flame. This flame has two points of combustion $B_1$, $B_2$. At the point $B_1$ air burns in gas while at the point $B_2$ gas burns in air. If the functions of the gas and air flows be interchanged at $B_1$, gas will burn in air, and at $B_2$ air in gas. By this means the flame will act as stated at the commencement of the specification in a reducing instead of an oxidizing manner. The flame passes over the bath 5 and over the fire-bridge into the outlet duct 6 which leads vertically downwards. It is displaced laterally from the centre plane of the furnace, so that it will exert a stirring effect on the bath. As the duct 6 leads downwardly the flame will always remain right on the bath and therefore comes into intimate contact with the same.

From the duct 6 the waste gases pass into the slag furnace 7. The slag will collect in the latter and is kept in a fluid state by the gases which constantly play over it. This is the difference between a slag furnace and a simple slag chamber in which no means are provided for keeping the slag in a fluid state. This slag which is being constantly formed can be tapped off through a tap-hole 8 for granulating purposes. Additions may be introduced through the door 9 of the furnace for rendering the slag suitable for fertilizer or for the manufacture of paving stones. Finally, burners 10 can be fitted in the furnace for raising the temperature of the waste gases, which is about 1300° to 2500° centigrade, and for producing in this manner a temperature at which valuable components, for instance titanium, may be procured from the slag by reduction.

From the slag furnace 7 the waste gases pass through the reversing valve 11 into the heat accumulator 12 and from thence through a second reversing valve 13 to the chimney flue 14. Through the valve 13 air enters at the same time in counter flow into the heat accumulator, namely into the second chamber, and from thence through the valve 11 into the up-cast air duct 15, from whence the air passes into the air duct 3. A fan may be placed on the air opening of the valve 13 for the purpose of increasing or decreasing the air pressure at will in order to regulate the length of the flame or the combustion points $B_1$ and $B_2$. The valve 11 is preferably cooled with water and in order to avoid an excessive cooling of the gas is lined inside with fire-resisting material. In the furnace as described, only the air is preliminarily heated. In the case of water gas this will be sufficient for obtaining the smelting temperature. When using other gases or for special purposes gas may of course be preliminarily heated as well.

In the direction of the flame behind the duct 6 is a preliminary heating chamber 16. In this chamber crucibles 17 are placed for smelting red and yellow brass. Additions to the materials which are to be worked-up in the furnace can just as well be preliminarily heated in the chamber 16.

On the fire-bridge crucibles 18 are placed for the manufacture of crucible steel. Between the crucibles the slag runs downwards into the slag furnace. A door 19 is provided for repairing the fire-bridge while the furnace is in operation. For introducing the crucibles, doors 20 are provided on the side of the furnace.

Above the furnace, and in the arch of the furnace openings 21 are provided into which air can be admitted for cooling the walls and the arch of the furnace. The back wall of the furnace can also be cooled by opening the door 19.

The invention as described may be applied in part to so-called mixers.

In the embodiment of the new furnace according to Figure 5, to the left of the smelting furnace 1, the burner 22 provided with gas and air ducts is fitted. Behind the fire-bridge a duct 6 leads in a downward direction to the slag furnace 7 and a duct 23 to a heating or reheating furnace 24. The latter has the usual doors 25 for introducing and removing, and openings 26 for pushing forward the material dealt with. A duct 27 leads from the furnace 24 to the chimney.

In the furnace arrangement according to Figure 5 the heating furnace 24 takes the place of the preliminary heating space 16 of Figure 1. While the latter only has a relatively limited field of use, the furnace 24 can, as stated in the preamble, be formed both as a heating or reheating furnace and more particularly as a roasting, calcining or agglomerating furnace and as a rotating furnace. Hence it considerably extends the field in which the furnace arrangements can be used.

A glance at the drawing of the complete furnace arrangements will show that all its separate parts, although they are united to form a whole, are each easily accessible, so that it is possible both to carry out repairs conveniently and to attend to the smelting furnace, the heating furnace and the slag furnace without particular trouble. From a thermodynamic point of view the construction of the furnace arrangement is of special advantage, as its unenclosed separate parts, which are each heated to a different extent, are not interfered with in any way by adjacent parts of the furnace.

A valve suitable for the new furnace arrangement may now be described.

Figure 7:
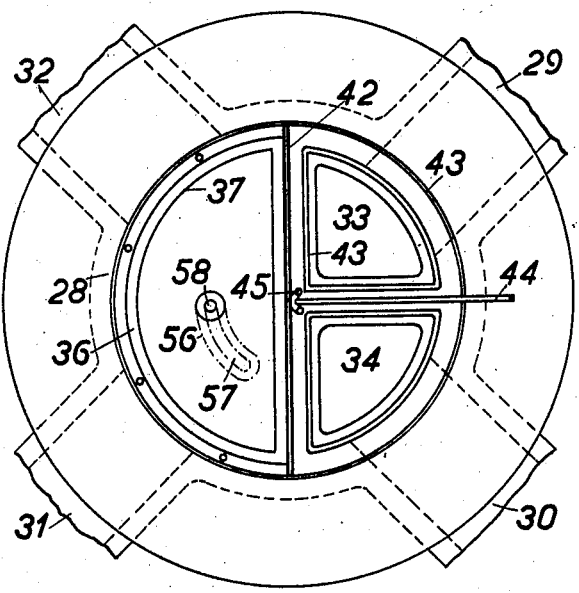

The valve shown in Figures 6 and 7 consists of a built-up base 28 in which the gas and waste gas passages 29, 30, 31 and 32 are arranged to end in the segment-like vertical passages 33, 34, 35 and a fourth passage which is not shown on the drawing, and which in Figure 6 lies behind the passage 35 and in Figure 7 underneath the left-hand half of the valve. The right hand half of the valve has not been shown in Figure 7. The vertical passage ports are covered by a bell 36 consisting of two hemispherical parts 37 and 38, which in the form of construction illustrated on the drawing consists of double-walled water-cooled iron cases. In order to protect the latter against the heat of the gases flowing through, as well as against chemical actions, they may be provided on the inside with suitable coating or a wall built of fire-resisting brickwork or other fire-resisting materials, with suitable metal linings. Instead of the iron cases, use may be made of laid on parts of brickwork, which, however, must be supported on an iron frame. They may be formed of two inverted U-shaped channels separated from one another. The gas passage through which the hot waste gases of the furnace are passed, for instance, the passage 29 is preferably arranged lower than the other passages in order that the corner 39 against which the hot gases strike shall be accessible. This corner is in that case also air-cooled and since it lies free, it may be improved without any difficulties. Cooling may also be effected by earth or specially provided cooling devices, for instance, water cooling.

The vertical passages 33, 34 and 35 connecting with the other passage are provided with recesses 40, in which air or water can circulate for cooling purposes. It is also possible to build up these passage parts in the form of double-walled water-cooled cases. Further, instead of providing the recesses in the brickwork, heat insulating layers of comparatively soft material may be inserted therein. In this way it is possible that the passage walls which are directly under the action of the hot gases can freely expand without being heated in a non-uniform way from both sides.

The packing tongues 41 and 42 engage in a known manner at the lower end of the bell in the groove 43 consisting of an annular ring with an inserted cross. According to this invention this groove may be made double-walled in order to improve the cooling so as to be able to force a cooling liquid, such as water under pressure, through it. The groove itself contains any kind of sealing means, for instance, as is well-known, water, or sand either alone or with water, tar, alone or with water, oil, metal dust, easily melting metals or like materials. The cooling in the double groove wall will then serve for the cooling of the contents of the groove as well as for the protection against chemical actions of the gases flowing through the valve. The groove may either lie in the brickwork that surrounds the mouths of the passages or be inserted therein. In the latter case an effective cooling of the upper edges of the passages is obtained and the resistance of the brickwork is improved.

A further improvement of the cooling may be effected by leading a pipe 44 to the middle of the groove cross (see also Figure 8). The pipe is provided with a member 45 with four openings between which the middle tongue 42 passes. The cooled liquid may be led through the pipe 44 from which it flows outside. The supply may be on the outside and the suction inside. As is shown in Figure 9, on an enlarged scale, the groove may be filled at the lower end with sand or tar or other suitable granular materials, a layer of water 47 being provided on top of said materials. In that case it is necessary, for the maintenance of the circulation of water, to insert a U-shaped circulating pipe 48 in the groove. In order to prevent foreign objects entering into the groove 43 the bell 36 may be provided with a horizontal flange 49 covering the groove.

Figure 10 illustrates the groove as made with double walls, the upper edges of the same being utilized as sealing surfaces. These sealing surfaces may be polished or provided with packing materials. A pipe 50 for the circulation of water penetrates into the two walls of the groove and leads to the inner space. Water also circulates in the hollow space 51 between the walls of the groove.

Figures 11 and 12 illustrate a further modification with wedge-shaped sealing at the lower side of the bell.

The groove shown in Figure 13 is provided with a double wall for the introduction of the cooling water under pressure but it contains inside a non-liquid substance, a granular sealing mass, or tar, or any other plastic material of suitable composition.
The bell 36 is provided at its lower end with a projection 52 which penetrates in a wedge-shaped form into the sealing mass 53 and carries the tongue 42.

Figure 6 also shows a device for actuating the bell. A plate 54 lies over the bell and is pivotally suspended on a shaft 55. Two projections 56 are provided on the lower side of the bell, which projections are formed with curved slots 57 (see Figure 7). Pins 58 provided on the bell 36 engage into the slots 57, and the bell may also be provided with a flange 59 and be mounted by means of balls or rollers on an annular support 60. The latter is carried by vertical rods 61 which run along the guide 63 on rollers 62. Moreover rollers 64 are provided on the vertical rim 65 of the disc 54. The rim 65 is provided with depressions 66 for the purpose of providing cam action. Devices may also be provided which will permit the bell 36 to be pressed on to the packing surfaces in order to improve the sealing.

When the bell is in position of rest the rollers 64 lie in the recesses 66. If it is desired to change over, the bell disc 54 is turned by means of the shaft 55, whereupon the rollers 64, the supports 61 and the bell 36 are raised by means of the cams 66 until the middle tongue 42 is lifted out of the groove 43. As soon as this has taken place the pins 58 at the opposite end of the slot 57 come to abut against the end and the bell is turned until it comes against the stop. The bell is then fixed in position and the disc 54 is turned backwards until the rollers 64 come to lie again in the lowest position of the recesses 66, whereby the bell drops again into the position shown in Figure 6.

When changing over it is advisable, when there is an under pressure in the neighbouring pipes, to blow steam into the valve in order to prevent the formation of an exploding gas and air mixture in consequence of the suction of the air or sucking over of the gas. Obviously the steam must then have a small over pressure. The new valve can then be used also as a stop valve, if one half thereof is formed, so to say, as a blind flange.

Figure 14 illustrates one form of construction of the new burner for the furnace. Figure 15 is a side elevation of the structure shown in Figure 14. The new burner consists of a series of pipes 67, the rear ends of which terminate in a closed passage 68. The second passage 69 surrounds the tubes at its horizontal end and is open towards the inner wall 70 of the furnace. The meshed structure 71 may be stretched out in front of the mouths of the pipes and of the passage 69, which meshed structure serves for an intimate mixture of the gas led into the pipes with the combustion air led to the passage 69, or vice versa. A mixing chamber may be provided between the openings of the pipe and the meshed structure, and in this case the latter serves for the purpose of preventing back-firing of the flame in the mixing chamber. The burner may also be constructed in the form of semi-circular pipes, as shown in Figure 16. Figure 17 shows an arrangement of pipes in a rectangular passage in which the pipes are held at predetermined distances by means of connecting rods.

The latter also serve, in addition to the fixing of the pipes in position, for the obtention of suitable distance between the tubes for obtaining special conditions of mixture.

As has already been mentioned above, any other kind of burner, for instance, a Bunsen burner, may be used. Furthermore, the meshed structure 71 may be used in conjunction with any burner.

The tubes of the burners may be of any desired section. The pipes may also be wound helically around their own axes, so that they receive a twist. The twist is also obtained by the provision of inner or outer ribs.

Referring to Figure 18, which is a plan view of the furnace, 72 indicates the hearth and 73 the normal inlet doors through which the charge is introduced and which are subsequently hermetically closed. On the side of the furnace in which the waste gas passage 74 is provided, additional doors 75 are arranged which serve as working doors during the smelting process for the introduction of further additions. In the reducing or smelting process this arrangement of the doors prevents any air from reaching the smelting bath, which would otherwise take place if the doors 73 were opened during said smelting process. The air which enters, during the smelting process, through the doors 75, is immediately removed by the waste gases into the outlet passage 74.

Figure 19 illustrates an arrangement in which the furnace according to Figures 1-4 is duplicated; the waste gas passage 76 is arranged in the middle, while on the left and on the right hand sides, hearths 77 and 78 respectively, are provided, together with the corresponding burners 79 and 80. Waste gas passages 81 and 82 are again provided in front of the burners, the passage 82 being covered by the lid 83.

When the burner 80 is in operation, and the smelting bath is on the hearth 78, the waste gases pass partly through the passage 76 and partly over the hearth 77 to the waste gas passage 81. A new charge is highly stacked up on the hearth 77. When the burner 79 is not in operation, the furnace then works in such a manner that smelting takes place on the hearth 78 while the fresh charge is only preheated in the hearth 77. The waste gases passing along over the latter are sucked through the passage 81 before they reach the burner 79, in order to protect the burner, which may, like the passage 82, be specially covered.

Figure 20 illustrates, in plan, a double furnace, 84 and 85 being heat accumulators, 86 the chimney, and 87, 88, 89 three valves. The supply of gas and air is as follows: in the mode of construction illustrated on the drawing the gas is not preheated, and is supplied to the burners 79 and 80 through the pipes 90. The burner 80 operates as in the arrangement illustrated in Figure 19. The air passes through an opening 91 in the valve 87, it traverses the passage 92 to the heat accumulator 85, is heated in the latter, then passes through the passage 93 to the valve 88, and from the latter through a short circuiting passage, through the valve 89 and the passage 94 to the burner 80. A connecting chamber 95 in the passage 94 is in communication, by passage 96, with the waste gas passage 82 which is covered by the lid 83 and which is forked in the base of the furnace. The waste gases pass once into the waste gas passage 76, then over the hearth 77, and then to the waste gas passage 81 which is similarly forked. The passage 76 leads to the valve 88 which leads part of the waste gases through the passage 97 to the heat accumulator 84. After the passage through the heat accumulator 84 the waste gases pass through a passage 98 and a valve 87 as well as through a passage 99 connected therewith to the chimney 86. The other portion of the waste gases pass from the waste gas channel 81 through a passage 100 to the connecting chamber 101, through a passage 102 to the valve 89, then traverse a low-lying passage 103 under the valves 88 and 87 and back to the chimney. It will be seen that by means of the described valve and arrangement of passages the burners 79 and 80 can at any time be intermittently put into operation and the waste gases be sucked accordingly alternately through the passage 76 as well as the passages 81 and 82. In this case the waste gas passage is covered which lies next to the burner that is in operation.

In order that the bath may be heated as uniformly throughout as possible, several burners may be provided on the guiding side of the flame, which burners work with flames of different lengths. One part of the bath will then receive a short flame, and another part a long flame, so that the various regions of the bath will be struck by the hottest part of the flames which are at different distances from the wall of the burners. In order to further increase the uniformity of the heating, use may be made of suitable switching over means which are well-known in the industry, for the purpose of varying the length of the flame of the individual burners so as to make them alternately short or long. Furthermore it is not necessary to arrange the burners on the front side of the furnace, as additional burners may be placed at other suitable points, for instance, on the front sides of the furnaces.

The individual forms of the burners, it may be said, assist one another in this way, so as to form a single uniform and hot flame covering the whole of the bath.

Depending upon the purpose for which the furnace is to be used, for instance, annealing heating, roasting or smelting furnace, the passages for the waste gases may lie higher or lower, and their form may be varied in order to obtain the most suitable guidance for the flame.

Figures 21-27 illustrate the above mentioned new valve arrangement which decreases the height of the furnace.

The waste gases of the furnace go from the latter into the slag chamber 7 and then through the passage 104 to the reversing valve 105. They pass through the latter and then through the passage 106 to the heat accumulator 12. The passage 106 is covered in Figure 21 by the passage 107, and it carries the heated gases or air supplied from the heated chamber of the heat accumulator 12, through the passage 108 and the valve 105 to the furnace. As will be clearly seen from Figure 21 the openings of the four channels 104, 106, 107 and 108 which are to be selectively connected by the valve are directed downward. They form a circular brick body with a cross of spokes in which a hollow ring 109 is positioned in said ring being also provided with a cross of spokes 110. Water passes through the ring 109 and the cross of spokes 110 for cooling purposes. On the underside of the same there are provided annular tongues 111 and cross tongues 112 (see also Figures 23 and 24). The bell 113 of the valve is also formed with a double wall and is filled with cooling water, and lined on the inside with a fireproof protecting layer 114. A double-walled partition 115, filled with water runs through the middle of the bell (see more particularly Figures 25 and 27) and trough-shaped channels 116, (Figure 26), extend on both sides perpendicular to this partition for the protection of the cross tongues 112, which do not immerse into the partition wall 115.

The bell 113 is supported by means of a ball bearing 117 on a frame 118, which is carried on a carriage 119 in such a manner that it can ascend and descend. As is diagrammatically illustrated in Figure 21, hydraulic cylinders 120 may be used for the ascent and descent of the bell 113, and 121 is a diagrammatic illustration of a guide for the bell 113.

In the position of the valve illustrated in Figure 21, the waste gases flow from the channel 104 in the half of the bell lying at the upper right hand side in Figure 25, around the trough-shaped channel 116, (Figure 26) to the channel 106, whilst the preheated air goes from the heat accumulators through the channel 108, through the part of the bell lying at the lower left-hand side in Figure 25, again around the other trough-shaped channel 116 and through the channel 107 to the burner of the furnace. If it is desired to reverse the order, the bell 113 is caused to descend by means of the cylinders 120 until the cross tongues 112 are released by the bell 113. Further the annular tongue 111, which extends further downwards, dips into the bell 113 so that everything remains sealed to the outside. The bell 113 can then be turned through a right angle, whereby the connection of the channels is changed in such a manner that the hot waste gases are led to the channel 108, whilst preheated air is led through the channel 106 to the valve and is carried away from the same to the channel 107. It is to be understood that a reversing valve is provided also in the other side of the heat accumulator, (see Figures 1-4).

As will be clearly seen from Figure 21, no part of the reversing valve lies above the slag chamber 7, or above the heat accumulator 12, so that the space between the smelting furnace and the said parts of the furnace arrangement can be confined to the minimum that is admissible for other reasons. In this way the entire construction of the furnace arrangement is substantially limited and economy is effected in the brickwork for channels and earth work.

I claim:

1. In combination, a furnace having a main and auxiliary heating portion; flame producing apparatus arranged to direct a flame into said main portion and heat said auxiliary portion; a slag chamber to receive slag and waste flame from said furnace; heat accumulating chambers connected to said slag chamber and heated by said waste flame therefrom said chamber surrounding a duct for the passage of air therethrough; and means whereby the waste flame is conducted continuously in one direction to said slag chamber to maintain the slag in liquid state.

2. In combination, a furnace having a main and auxiliary heating portion; flame producing apparatus arranged to direct a flame into said main portion and to heat said auxiliary portion; a slag chamber to receive slag and waste flame from said furnace; and heat accumulating chambers cooperating with said slag chamber and heated by the waste flame therefrom, and having an upwardly-extending air-duct therebetween connecting to the end of said furnace surrounding said flame-producing apparatus.

3. In combination, a furnace; means for heating said furnace; heat accumulating chambers cooperating with said furnace and heated by the waste flame therefrom, and having an upwardly extending air-duct therebetween connecting to the end of said furnace surrounding said flame-producing apparatus.

4. In combination, a horizontally elongated enclosed furnace having an ore-receiving hearth located on the bottom thereof near one end and having openings through such end for receiving flame-producing apparatus, and cool air inlet openings through said end and top directly over the hearth, the opposite end being sufficiently removed from said hearth to provide an auxiliary heating chamber having a door therein; and flame-producing apparatus received in said furnace comprising concentric air and gas inlets arranged to direct a flame across said hearth having two combustion points.

5. In combination, a furnace having an auxiliary heating portion; means for heating said furnace; a slag chamber under said auxiliary portion; a waste flame duct connecting said auxiliary portion to said slag chamber, said duct directing the waste flame directly against the slag of said slag chamber at one end thereof and thereby maintaining the slag in fluid state, a second waste-flame duct at the other end; heat accumulating chambers adjacent said slag chamber and under said furnace and having an upwardly extending air-duct therebetween, connecting to the end of said furnace surrounding said flame-producing apparatus; a reversing valve connecting one end of said heat accumulators and air-duct to said second waste-flame duct of said slag chamber; and a second reversing valve for connecting said heat accumulating chambers at their other end to a chimney; said valves cooperating to direct the waste flame from said slag chamber through one heat-accumulating chamber to a chimney and at the same time provide for the induction of cool air into the other of said heat accumulating chambers, where it is heated, and for passage therefrom into said air-duct and thence to said furnace.

F. WILHELM CORSALLI